(12) United States Patent
Hernandez et al.

(10) Patent No.: US 9,535,720 B2
(45) Date of Patent: Jan. 3, 2017

(54) SYSTEM FOR CAPTURING AND REPLAYING SCREEN GESTURES

(71) Applicant: TeaLeaf Technology, Inc., San Francisco, CA (US)

(72) Inventors: Omar Hernandez, San Francisco, CA (US); Sukhbir Singh, San Francisco, CA (US); Neel Phadnis, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/783,866

(22) Filed: Mar. 4, 2013

(65) Prior Publication Data

US 2014/0137052 A1 May 15, 2014

Related U.S. Application Data

(60) Provisional application No. 61/725,823, filed on Nov. 13, 2012.

(51) Int. Cl.
*G06F 3/048* (2013.01)
*G06F 9/44* (2006.01)
(Continued)

(52) U.S. Cl.
CPC ......... *G06F 9/4443* (2013.01); *G06F 3/04883* (2013.01); *G06F 11/30* (2013.01); *G06Q 10/109* (2013.01)

(58) Field of Classification Search
CPC .. G06Q 10/109; G06Q 10/1093; G06Q 10/06; H04L 67/22
(Continued)

(56) References Cited

U.S. PATENT DOCUMENTS 5,463,547 A 10/1995 Markowitz
5,564,043 A 10/1996 Siefert
(Continued)

FOREIGN PATENT DOCUMENTS

CA 2656539 2/2008
CA 2696884 3/2009
(Continued)

OTHER PUBLICATIONS

Smith et al., "Automated Protocol Analysis," Human Computer Interaction, 8:101-145, 1993.
(Continued)

*Primary Examiner* — Ajay Bhatia
*Assistant Examiner* — Jian Yu
(74) *Attorney, Agent, or Firm* — Rahan Uddin; Edell, Shapiro & Finnan, LLC

(57) ABSTRACT

A capture system may capture client events for an application session. Some client events may contain display information associated with screen gestures. The screen gestures may be associated with any user input that changes how images are displayed during the application session. For example, the screen gestures may comprise one or more of a scroll gesture, a touch start gesture, a touch move gesture, a touch end gesture, and/or a pinch gesture. In another example the screen gesture may comprise a reorientation of a device operating in the application session. A replay system may replay the application session based on the captured client events to recreate images displayed during the application session in response to the screen gestures.

21 Claims, 13 Drawing Sheets

(51) Int. Cl.
 *G06F 11/30* (2006.01)
 *G06F 3/0488* (2013.01)
 *G06Q 10/10* (2012.01)

(58) Field of Classification Search
 USPC .......................................................... 715/863
 See application file for complete search history.

(56) References Cited

U.S. PATENT DOCUMENTS

| | | |
|---|---|---|
| 5,577,254 A | 11/1996 | Gilbert |
| 5,699,526 A | 12/1997 | Siefert |
| 5,715,314 A | 2/1998 | Payne |
| 5,717,879 A | 2/1998 | Moran et al. |
| 5,721,906 A | 2/1998 | Siefert |
| 5,751,962 A | 5/1998 | Fanshier et al. |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,870,559 A | 2/1999 | Leshem et al. |
| 5,894,516 A | 4/1999 | Brandenburg |
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,182,097 B1 | 1/2001 | Hansen et al. |
| 6,253,203 B1 | 6/2001 | O'Flaherty et al. |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,766,333 B1 | 7/2004 | Wu et al. |
| 6,850,975 B1 | 2/2005 | Danneels et al. |
| 6,877,007 B1 | 4/2005 | Hentzel et al. |
| 7,076,495 B2 | 7/2006 | Dutta et al. |
| 7,260,837 B2 | 8/2007 | Abraham |
| 7,272,639 B1 | 9/2007 | Levergood |
| 7,278,105 B1 | 10/2007 | Kitts |
| 7,293,281 B1 | 11/2007 | Moran et al. |
| 7,490,319 B2 | 2/2009 | Blackwell et al. |
| 7,580,996 B1 | 8/2009 | Allan |
| 7,627,648 B1 | 12/2009 | Mehta |
| RE41,903 E | 10/2010 | Wenig |
| 8,042,055 B2 | 10/2011 | Wenig |
| 8,127,000 B2 | 2/2012 | Wenig |
| 8,219,531 B2 | 7/2012 | Eagan et al. |
| 8,335,848 B2 | 12/2012 | Wenig |
| 8,381,088 B2 | 2/2013 | Kikin-Gil et al. |
| 8,533,532 B2 | 9/2013 | Wenig |
| 8,583,772 B2 | 11/2013 | Wenig |
| 8,838,736 B2 | 9/2014 | Swahn |
| 2002/0049840 A1 | 4/2002 | Squire |
| 2002/0056091 A1 | 5/2002 | Bala |
| 2002/0065912 A1 | 5/2002 | Catchpole et al. |
| 2002/0070953 A1 | 6/2002 | Barg et al. |
| 2002/0083169 A1 | 6/2002 | Aki |
| 2002/0083183 A1 | 6/2002 | Pujare et al. |
| 2002/0112035 A1 | 8/2002 | Carey |
| 2002/0165954 A1 | 11/2002 | Eshghi et al. |
| 2003/0005000 A1 | 1/2003 | Landsman |
| 2003/0023715 A1 | 1/2003 | Reiner et al. |
| 2003/0128233 A1 | 7/2003 | Kasriel |
| 2003/0145071 A1 | 7/2003 | Straut |
| 2003/0154289 A1 | 8/2003 | Williamson et al. |
| 2004/0019675 A1 | 1/2004 | Hebeler |
| 2004/0059809 A1 | 3/2004 | Benedikt et al. |
| 2004/0059997 A1 | 3/2004 | Allen et al. |
| 2004/0078464 A1 | 4/2004 | Rajan |
| 2004/0100507 A1 | 5/2004 | Hayner et al. |
| 2004/0158574 A1 | 8/2004 | Tom et al. |
| 2005/0021713 A1 | 1/2005 | Dugan et al. |
| 2005/0030966 A1 | 2/2005 | Cai et al. |
| 2005/0033803 A1 | 2/2005 | Vleet et al. |
| 2005/0066037 A1 | 3/2005 | Song et al. |
| 2005/0071464 A1 | 3/2005 | Kuwata et al. |
| 2005/0071760 A1* | 3/2005 | Jaeger ........................... 715/705 |
| 2005/0086606 A1 | 4/2005 | Blennerhassett et al. |
| 2005/0188080 A1 | 8/2005 | Motsinger et al. |
| 2005/0216856 A1 | 9/2005 | Matti |
| 2005/0246651 A1 | 11/2005 | Krzanowski |
| 2005/0278565 A1 | 12/2005 | Frattura et al. |
| 2006/0048153 A1 | 3/2006 | Truong |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2006/0162071 A1 | 7/2006 | Dixon et al. |
| 2006/0230105 A1 | 10/2006 | Shappir |
| 2006/0248452 A1 | 11/2006 | Lambert |
| 2007/0106692 A1 | 5/2007 | Klein |
| 2007/0174410 A1 | 7/2007 | Croft |
| 2007/0226314 A1 | 9/2007 | Eick |
| 2007/0245249 A1 | 10/2007 | Weisberg |
| 2007/0255754 A1 | 11/2007 | Gheel |
| 2008/0005661 A1 | 1/2008 | Yao et al. |
| 2008/0005793 A1 | 1/2008 | Wenig |
| 2008/0034036 A1 | 2/2008 | Takeshima et al. |
| 2008/0046562 A1 | 2/2008 | Butler |
| 2008/0052377 A1 | 2/2008 | Light |
| 2008/0127217 A1 | 5/2008 | Wang |
| 2008/0162498 A1* | 7/2008 | Omoigui ........................ 707/10 |
| 2008/0184129 A1 | 7/2008 | Cancel et al. |
| 2008/0209311 A1 | 8/2008 | Agronik |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1 | 1/2009 | Brimley |
| 2009/0024930 A1 | 1/2009 | Kim |
| 2009/0037517 A1 | 2/2009 | Frei |
| 2009/0037914 A1 | 2/2009 | Chagoly et al. |
| 2009/0063968 A1 | 3/2009 | Wenig |
| 2009/0070869 A1 | 3/2009 | Fan et al. |
| 2009/0083714 A1 | 3/2009 | Kiciman et al. |
| 2009/0132957 A1* | 5/2009 | Reddy ........................... 715/786 |
| 2009/0138554 A1 | 5/2009 | Longoboard et al. |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0007603 A1* | 1/2010 | Kirkup ........................... 345/158 |
| 2010/0042573 A1 | 2/2010 | Wenig |
| 2010/0058285 A1 | 3/2010 | Meijer et al. |
| 2010/0070929 A1 | 3/2010 | Behl et al. |

(56) References Cited

U.S. PATENT DOCUMENTS

| | | | |
|---|---|---|---|
| 2010/0146380 A1 | 6/2010 | Rousso | |
| 2010/0169792 A1 | 7/2010 | Ascar | |
| 2010/0174774 A1* | 7/2010 | Kern | H04L 29/06 709/203 |
| 2010/0211638 A1 | 8/2010 | Rougier | |
| 2010/0251128 A1 | 9/2010 | Cordasco | |
| 2010/0268694 A1 | 10/2010 | Denoue | |
| 2010/0287229 A1 | 11/2010 | Hauser | |
| 2010/0318507 A1 | 12/2010 | Grant et al. | |
| 2011/0029665 A1 | 2/2011 | Wenig et al. | |
| 2011/0085526 A1* | 4/2011 | Joseph | H04M 1/72533 370/338 |
| 2011/0173239 A1* | 7/2011 | Sayed et al. | 707/821 |
| 2011/0320880 A1 | 12/2011 | Wenig | |
| 2012/0002903 A1 | 1/2012 | Wilensky | |
| 2012/0038678 A1* | 2/2012 | Hwang et al. | 345/667 |
| 2012/0084437 A1 | 4/2012 | Wenig | |
| 2012/0089950 A1* | 4/2012 | Tseng | 715/854 |
| 2012/0102101 A1 | 4/2012 | Wenig | |
| 2012/0151329 A1 | 6/2012 | Cordasco | |
| 2012/0151384 A1 | 6/2012 | Stass | |
| 2012/0157122 A1* | 6/2012 | Niranjan et al. | 455/456.2 |
| 2012/0173966 A1* | 7/2012 | Powell | G06F 17/2247 715/234 |
| 2012/0242604 A1* | 9/2012 | Kato | H04N 1/00381 345/173 |
| 2013/0069947 A1* | 3/2013 | Berstler et al. | 345/428 |
| 2013/0091417 A1 | 4/2013 | Cordasco | |
| 2013/0097484 A1* | 4/2013 | Nakamura | G06F 17/30867 715/234 |
| 2013/0104065 A1 | 4/2013 | Stecher | |
| 2013/0136253 A1* | 5/2013 | Liberman Ben-Ami | H04M 3/5191 379/265.09 |
| 2013/0339428 A1 | 12/2013 | Wenig | |
| 2014/0063174 A1 | 3/2014 | Junuzovic | |
| 2014/0108911 A1 | 4/2014 | Damale | |
| 2014/0109018 A1* | 4/2014 | Casey et al. | 715/863 |
| 2014/0115506 A1* | 4/2014 | George | G06F 3/048 715/764 |
| 2014/0115712 A1 | 4/2014 | Powell | |
| 2014/0143652 A1 | 5/2014 | Deloach | |
| 2014/0250110 A1* | 9/2014 | Yang et al. | 707/723 |

FOREIGN PATENT DOCUMENTS

| | | |
|---|---|---|
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Bishop, Matt et al., "A Model of Security Monitoring", Department of Mathematics and Computer Science, Dartmouth College, pp. 46-52. Dec. 1989.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999 (Oct. 21, 1999), pp. 337-355.
International Search Report for PCT/US08/65582; Date of Mailing Sep. 11, 2008.
International Search Report for PCT/US2007/071096; Date of mailing May 13, 2008.
Written Opinion of the International Searching Authority for PCT/US08/65582; Mailing date Sep. 11, 2008.
Written Opinion of the International Searching Authority for PCT/US07/71096; Mailing date May 13, 2008.
PCT Search Report for PCT/US2011/033813; Mailing Date Jul. 28, 2011.
Written Opinion of the International Searching Authority for PCT/US2011/033813; Mailing Date Jul. 28, 2011.
International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Disclosure Bulletin, pp. 195-198, Feb. 1991.
International Search Report for PCT/US11/35410; Date of mailing Dec. 14, 2011.
Written Opinion of the International Searching Authority; PCT/US11/35410; Date of mailing Dec. 14, 2011.
Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Lubarsky, How to Delete Cookie Using Javascript, Aug. 19, 2007, http:web.archive.org/web/20070819123555/http://blogs.x2line.com/al/articles/316.aspx.
International Search Report for PCT/US12/25971; Date of mailing May 31, 2012.
Written Opinion of the International Searching Authority for PCT/US12/25971; Date of mailing May 31, 2012.
Peter Brusilovsky et. al., "Adaptive and Intelligent Web-based Educational Systems," International Journal of Artificial Intelligence in Education, Apr. 1, 2003 (Apr. 1, 2003), pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move—User Activity Tracking for Website Usability Evaluation and Implicit Interaction," WWW '06 Proceedings of the 15th World Wide Web, ACM, New York, NY, USA, May 22, 2006 (May 22, 2006), pp. 203-212, XP002519605, DOI: 10.1145/1135777.1135811 ISBN 978-1-5959-323-2.
Reed Martin; Using Google Analytics Site Overlay; Community Spark; Apr. 13, 2007. Online: <http://www.communityspark.com/using-google-analytics-site-overlay/>.
Stolowitz Ford Cowger LLP; Listing of Related Cases; Mar. 14, 2012.
International Search Report for PCT/US2013/023636; Date of Mailing Aug. 13, 2013.
Written Opinion of the International Searching Authority for PCT/US2013/023636; Date of Mailing Aug. 13, 2013.
Stolowitz Ford Cowger LLP Listing of Related Cases May 14, 2013.
Communication from the EP Patent Office pursuant to Article 94(3) EPC in EP Application No. 09806979.2; dated Jan. 6, 2014.
Rubio, An Introduction to JSON, Feb. 28, 2007, http://www.oracle.com/technetwork/articles/entarch/introduction-json-097942.html.
Teare, An Introduction to Ajax, Aug. 2005, http://www.oracle.com/technetwork/articles/entarch/ajax-introduction-096831.html.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.
MEL; Distribute Paths to Separate Layers—Illustrator Tutorial; pp. 1-3; Aug. 23, 2009.

* cited by examiner

CLIENT ENVIRONMENT DATA  ⟋ 200

```
webEnvironment:
    libVersion: Current library version
    page: Webpage being captured
    windowId: Id of the window screen:
        devicePixelRatio:      CSS pixel ratio
        deviceOriginalWidth:   Device width based on screen pixel density
        deviceOriginalHeight:  Device height based on screen pixel density
        deviceWidth:           CSS pixel screen width
        deviceHeight:          CSS pixel screen height
        deviceToolbarHeight:   Browser toolbar height
        width:                 width of viewport
        height:                height of viewport
        orientation:           Orientation of the screen
        orientationMode:       PORTRAIT or LANDSCAPE
```

FIG. 3A

CLIENT STATE EVENT  ⟋ 210

```
pageWidth: Width of the document of the webpage                               212
pageHeight: Height of the document of the webpage
viewPortWidth: Width of the viewport
viewPortHeight: Height of the viewport
viewPortX: x position of the scrollbar on viewport
viewPortY: y position of the scrollbar on viewport
deviceOrientation: The orientation of the screen of the device
event: Event that triggered the client state
deviceScale: Value to scale screen during replay to represent what user saw
viewTime: Time in milliseconds user was on the event triggered
```

FIG. 3B

CONTROL EVENT  220 focusInOffset: Milliseconds offset from offset for when focusIn of text fields occur
target: Control being logged
position: Position of control being logged
    x: X of the control
    y: Y of the control
    height: height of control
    width: width of control
relXY: Relative X & Y ratio that can be from 0 to 1 with a default value of 0.5
id: Id/Name/Tag of control
idType: To indicate what id is based on id, name or xPath
dwell: Dwell time of control
visitedCount: Number of times a form control has been visited by the user
isParentLink: To indicate if control a A type tag
name: Name of control
type: Type of control
subType: SubType of control
tlType: tlType of control that normalizes the control type for eventing
prevState: Previous state of control
currState: Current state of control]
event: Event from control
    type: Type of event
    subType: Subtype of event

FIG. 3C

SYSTEM FOR CAPTURING AND REPLAYING SCREEN GESTURES

The present application claims priority to provisional patent application Ser. No. 61/725,823, filed Nov. 13, 2012, entitled: CAPTURE AND REPLAY OF TOUCH SCREEN GESTURES which is herein incorporated by reference in its entirety.

BACKGROUND

Monitoring systems may monitor and capture user interface (UI) events during application sessions. For example, the application session may comprise a web session where the user accesses a website for purchasing a product on-line. The captured UI events may comprise user inputs, selections, and/or navigation through the webpages of the website. A replay system may replay the UI events to reproduce the images and states that the user viewed and created during the original application session. The replayed application session may identify problems or other conditions that the user experienced during the original application session.

More application sessions are being conducted on relatively small portable devices with touch screens, such as laptops, smart phones and notebook computers. The user may manipulate content displayed within the touch screen using screen gestures. For example, the user may zoom-in on an image by placing two fingers on the touch screen and performing a pinch-in gesture. In another example, the user may scroll to a different location of an image by sliding one of the fingers across the touch screen.

Screen gestures may be more common on smaller computing devices where touch screens provide the primary user interface. Screen gestures also may be more prevalent in smaller computing device with smaller display screens that require more screen manipulations to view the correct information on displayed webpages.

Current monitoring systems may not adequately capture screen gestures and thus may not be able to accurately recreate some user experiences from the original application session. For example, current monitoring systems may only capture Hyper Text Markup Language (HTML) for webpages and use the HTML during replay to render the webpages.

BRIEF SUMMARY

A capture system may capture client events for an application session. Some client events may contain display information associated with screen gestures. The screen gestures may be associated with any user input that changes how images are displayed during the application session. For example, the screen gestures may comprise one or more of a scroll gesture, a touch start gesture, a touch move gesture, a touch end gesture, and/or a pinch gesture. In another example the screen gesture may comprise a reorientation of a device operating in the application session. A replay system may replay the application session based on the captured client events to recreate images displayed during the application session in response to the screen gestures.

BRIEF DESCRIPTION OF THE DRAWINGS

FIGS. 3A-3C depict examples of display information contained in gesture events.

DETAILED DESCRIPTION

Screen gestures may comprise any input that changes how an image is displayed on a computer screen. Examples of screen gestures may comprise a zoom-in operation, a zoom-out operation, a scroll operation, or the like, or any combination thereof. Other examples of screen gestures may comprise touch patterns, such as a user making a Z-pattern on the touch screen. Another example of a screen gesture may comprise a device reorientation where a computing device is rotated causing a displayed image to change between a profile orientation and a landscape orientation.

Some webpages and other content may not be properly designed for smaller screen sizes of some computing devices. The smaller display screens may require more screen gestures including multiple zooms, swipes, scrolls, and/or orientation changes in order to display the correct content at the correct resolution. Capturing and replaying these screen gestures, or the results of the screen gestures, may identify areas of struggle and/or identify specific information sought out by the user during an application session.

A capture system captures electronic pages and user inputs for an application session. The capture system also captures gesture events associated with screen gestures applied to a computing device during the application session. A replay system may use the captured gesture events to recreate images resulting from the screen gestures. The recreated images may provide an improved recreation of a user experience during the original application session. For example, the replayed gesture events may identify a user struggling to display a correct location on a webpage or may identify the user struggling to navigate though a correct information discovery path.

Figure 1:
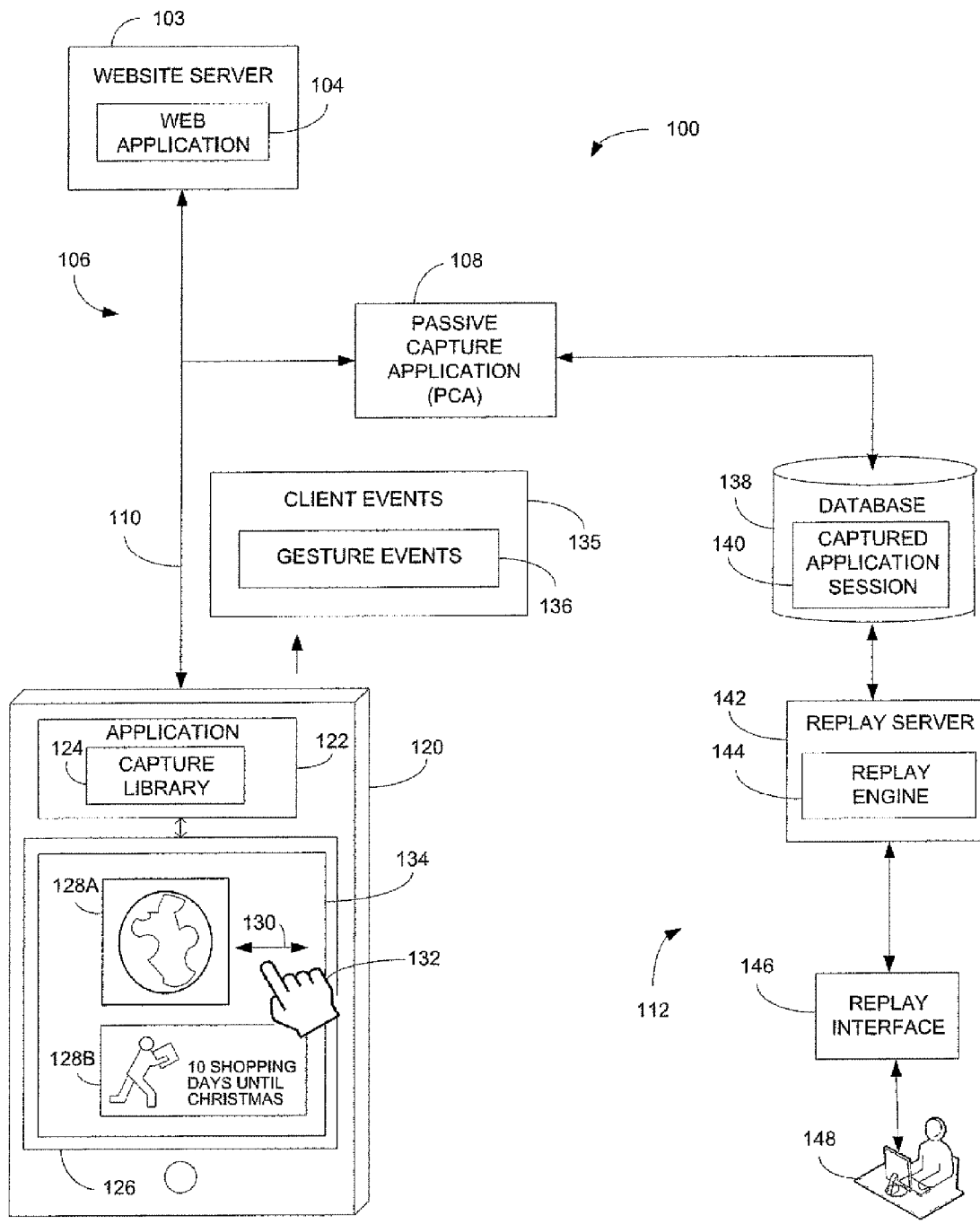
FIG. 1 depicts an example of a capture and replay system for capturing an application session.

FIG. 1 depicts an example of a capture and replay system 100 configured to capture and replay gesture events 136. A client device 120 may be any computing device that operates a native or server based application 122. For example, client device 120 may be a smart phone, Personal Digital Assistant (FDA), terminal, personal computer, laptop computer, tablet computer, notebook computer, etc.

Client device 120 may be operably coupled to a website server 103 via network 110. Network 110 may be any combination wired and/or wireless networks, such as Internet networks, Local Area Networks (LANs), Wide Area Network (WANs), Public Service Telephone Networks (PSTNs), cellular networks, or the like, or any combination thereof.

Application 122 may comprise any combination of software and/or hardware that conduct an application session 106. Application 122 may provide different functions on client device 120. For example, application 122 may be used for purchasing items or services, playing video games, digital navigation, searching the Internet, etc. These of course are just examples of any function that may be performed by application 122 on client device 120.

For simplicity, only one application 122 is shown in FIG. 1. However, it should be understood any variety of different applications 122 may be executed on client device 120. In one example, application 122 may be a server based application that operates within a web browser environment and communicates with an associated web application 104 operating on website server 103 during application session 106. In another example, application 122 may be a native application that at times operates independently from web application 104 and at other times exchanges data with web application 104.

Application 122 may display images 128A and 128B within a screen 126 on client device 120. In one example, images 128 may be displayed within a webpage 134 displayed within a web browser. Webpage 134 and images 128 may include control fields or selectable control icons such as login and password fields for receiving alphanumeric data. In another example some of images 128 may not have associated control functions, such as Joint Photographic Experts Group (JPEG) images or portable document format (PDF) images. In another example, images 128 may be associated with Hyper Text Transfer Protocol (HTTP) links that in response to selection send requests to web application 104 for other webpages. These of course are just some examples and application 122 may display any images 128 or any type of information on screen 126 and may perform any associated control operations in response to selection of the images.

In one example, screen 126 may comprise a touch screen configured to manipulate webpage 134 in response to a screen gesture 130. In another example, screen 126 may not comprise a touch screen and the user may use a keyboard to apply screen gesture 130. In one touch screen example, a user may press and slide a finger of hand 132 over screen 126 causing client device 120 to display a different portion of webpage 134. In another example, screen gesture 130 may comprise two fingers of hand 132 pressing and pinching-in against screen 126 causing client device 120 to zoom out webpage 134. In another example, screen gesture 130 may comprise the two fingers of hand 132 pressing and pinching-out against screen 126 causing client device 120 to zoom-in webpage 134.

In another example, the user may rotate or shake client device 120 in order to rotate webpage 134 within screen 126 between a portrait orientation and a landscape orientation. In yet another example, gesture 130 may comprise simply tapping on touch screen 126 with a finger of hand 132 to make a selection, initiate a function, change which webpage 134 is displayed, or change what portion or how webpage 134 is displayed. These are all just examples and a user may perform any screen gesture 130 with screen 126 of client device 120.

During application session 106, application 122 may send requests from client device 120 to web application 104. For example, a user may select a link or icon within webpage 134 or may enter data into a field displayed within webpage 134. Application 122 may send the request to web application 104 in response to the selection or data entry. Web application 104 may send responses back to application 122 based on the requests. For example, web application 104 may send back another webpage for displaying on screen 126 or may send additional information for displaying with currently displayed webpage 134, such as data for a drop-down menu.

Capture and replay system 100 may comprise a capture library 124 embedded within application 122, a passive capture application (PCA) 108, and a replay system 112. For simplicity, other elements of system 100 are not shown but may include other session processing servers and/or any other processing elements used for capturing and replaying application session 106.

PCA 108 may capture any communications exchanged between application 122 and web application 104. For example, PCA 108 may capture webpage 134 and any data loaded into webpage 134, such as images, fields, data, text, Document Object Models (DOM), metadata, HTML, control embedded into the HTML, or the like or any combination thereof.

Capture library 124 may capture and/or generate additional client events 135 on client device 120. Client events 135 may include, but is not limited to, user inputs, image display information, mouse clicks, keyboard entries, data, text, Document Object Model (DOM) changes, and any other changes in the state of application session 106 and/or any other information generated on client device 120 during application session 106.

Capture library 124 may be configured to operate with any mobile or desk top operating system, such as a JavaScript library, an iOS library, and/or an Android® library. Client events 135 may be formatted into a JavaScript Object Notation (JSON) file. However, capture library 124 may use other formats, such as Extensible Markup Language (XML), a simple http post, or the like, or any combination thereof.

Capture library 124 may capture and queue multiple client events 135 for sending indirectly to PCA 108 via web application 104. For example, capture library 124 may queue client events 135 until reaching a threshold size and then send the queued client events 135 to a target page on website server 103. PCA 108 then may capture client events 135 sent from capture library 124 to website server 103.

Capture library 124 may capture gesture events 136 as part of client events 135. Gesture events 136 may identify a screen gesture 130 performed by a user during application session 106 and may contain display information associated with screen gesture 130. Screen gesture 130 may be detected from any operating system or computing hardware, such as Surface for Windows® devices and phones. Example of screen gesture 130 may comprise a scroll, screen touch, or pinch operation. Gesture events 136 also may include display information that identify how webpage 134 and images 128 are displayed on screen 126 in response to screen gesture 130.

PCA 108 and/or a processing server may combine and store all of the captured webpages and client events 135 for application session 106 into a same application session file 140 in a database 138. PCA 108, capture library 124, and/or another processing server may add a session identifier and timestamps to client events 135 identifying a sequence the client events were detected and/or captured during application session 106.

A replay system 112 may comprise any combination of database 138, replay server 142, replay interface 146, and/or computer 148. A user operating computer 148 may use replay interface 146 to select application session file 140. A replay engine 144 operating on replay server 142 may render the web pages displayed during application session 106, Replay system 112 then may apply client events 135 from application session file 140 to the rendered webpages.

Replay system 112 may identify some of client events 135 in application session file 140 as gesture events 136. Replay system 112 may use display a skin on computer 148 based on display information in gesture events 136. The skin may represent the physical dimensions of client device 120 and screen 126 and may simulate the physical display environment viewed by the user during application session 106.

Replay system 112 may display webpage 134 within the skin based on additional display information in gesture events 136. The additional display information may identify the type of screen gesture 130 and indicate how webpage 134 was displayed on screen 126 in response to screen gesture 130. Replay system 112 may use the display information to recreate a display state of webpage 134 after screen gesture 130.

Figure 2:
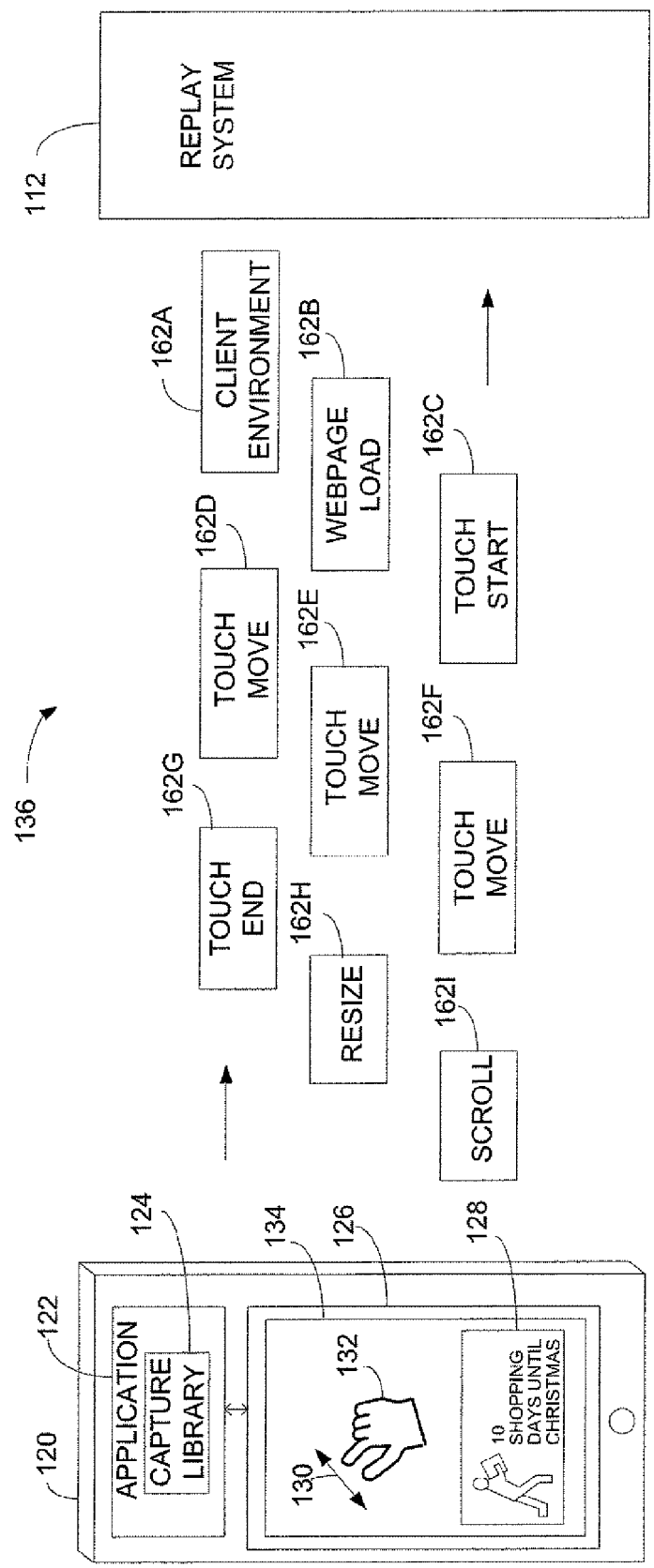
FIG. 2 depicts an example of gesture events captured during an application session.

FIG. 2 depicts an example of gesture events 136 that may be detected and captured by capture library 124. It may be difficult to capture and reproduce the results of screen gesture 130 due to data proliferation and a large amount of event noise that may be produced. It also may be difficult to understand when screen gesture 130 starts and ends. For example, the user may press hand 132 on screen 126 multiple times in order to display a desired portion of webpage 134 and multiple gestures 130 may overlap if more than one finger is being used.

Capture library 124 may generate multiple gesture events 136 in order to identify and distinguish between each screen gesture 130. For example, gestures events 136 may identify a webpage load event, a webpage unload event, a webpage resize event, a webpage scroll event, a webpage orientation-change event, a webpage touch-start event, a webpage touch-end event, a webpage touch-move event, a webpage touch-cancel event, or the like, or any combination thereof.

In one example, screen gesture 130 may comprise a pinch gesture where two fingers of hand 132 are placed on screen 126 and moved in an inner to outer direction to zoom-in to a specific location within webpage 134. Capture library 124 may capture a series of gesture events 136 based on the pinch operation associated with screen gesture 130. For example, capture library 124 may first capture client environment data 162A for client device 120. Client environment data 162A may identify the physical display parameters of client device 120 and screen 126.

Capture library 124 also may capture a webpage load event 162B identifying loading of webpage 134, a webpage touch start event 162C indicating one or more fingers touching screen 126, a series of webpage touch move events 162D-162F identifying movements of the fingers over screen 126, a webpage touch end event 162G indicating removal of hand 132 from screen 126, a webpage resize event 162H indicating a resizing of webpage 134, and a webpage scroll event 162G indicating scrolling of a finger of hand 132 over screen 126.

Some gesture events 136 may identify the end of gesture 130. For example, capture library 124 may trigger generation of touch end event 162G when the fingers of hand 132 are lifted off of screen 126. Replay system 112 may use the gesture ended events to determine when to display a gesture modified webpage 134. For example, replay system 112 may identify a first one of gesture events 136 associated with a display state of webpage 134 before screen gesture 130 and may identify a second one of gesture events 136 associated with a display state of webpage 134 after screen gesture 130. Replay system 112 may display webpage 134 based on display information contained in the two identified gesture events. For example, replay system 112 may use the first one of the gesture events to display a state of webpage 134 prior to screen gesture 130 and may use the second one of the gesture events to display a state of webpage 134 after completion of gesture 130.

Some gesture events 136 may be associated with control operations and other gesture events 136 may be associated with screen changes. For example, a first control event may be associated with a user selecting, touching, or clicking on a form within webpage 134. A second client state event may be associated with the user changing the viewport of the images displayed on screen 126.

FIG. 3A depicts an example of client environment data 200. Referring to FIGS. 1 and 3A, replay system 112 may use captured client environment data 200 to generate a skin on computer 148. The skin may replicate the physical dimensions and orientation of screen 126 within client device 120 used during application session 106. In one example, client environment data 200 may be captured and attached as a header in other gesture events 136. In another example, client environment data 200 may be sent as a separate gesture event 136.

Capture library 124 may infer a type of client device 120 from a browser agent string provided by the browser operating on client device 120. A LibVersion field may identify a version of capture library 124 operating on application 122. A page field may identify the webpage Universal Resource Locator (URL) for a webpage displayed during the application session. A WindowID field may provide a generic identifier for a type and size of window screen displaying the webpage during the application session.

A devicePixelRatio field may identify a pixel ratio for a Cascading Style Sheet (CSS) displayed on the client device. A deviceOriginalWidth field and a deviceOriginalHeight field may identify an original width and height of screen 126 on client device 126.

A deviceWidth field and a deviceHeight field may identify the CSS pixel screen width and height, respectively. The CSS pixel screen dimensions may identify the size of the image actually displayed to the user on screen 126. For example, the device pixel ratio may be applied to the original width and height of screen 126 to obtain a CSS to screen pixel ratio.

A deviceToolbarHeight field may identify a size of a web browser tool bar that may be displayed on screen 126. The capture library may determine the toolbar height value from web browser 134 and subtract that value from a reported screen height to identify the display area on screen 126. Replay system 112 may adjust the scale factor of displayed webpages based on the deviceToolbarHeight field value.

A width field and a height field may identify the width and height of the web browser viewport. The view port may identify the area of the web browser where webpages are displayed. The view port value may allow the replay system to identify certain application session problems. For example, some client device may have relatively small display screens that only display small portions of webpages at one time. Poorly designed web applications may repeatedly show the wrong portion of webpages. The replay system may use the viewport values to recreate the incorrectly displayed webpages.

An orientation field may identify the orientation of the image displayed on client device 120. For example, a top to bottom long x-axis of client device 120 and screen 126 may be vertically orientated or horizontally oriented. Client device 120 may identify the orientation as 0 degrees or 90 degrees with respect to a vertical or horizontal x-axis orientation of client device 120. An orientationMode field may use the degrees of orientation to identify the image in screen 126 as having a portrait orientation or a landscape orientation.

FIG. 3B depicts an example of a first type of gesture event referred to as a client state event 210. Referring to FIGS. 1 and 3B, client state event 210 may identify changes in how images or webpages are displayed on screen 126 of client device 120. Capture library 124 may generate client state event 210 in response to different screen events. For example, capture library 124 may generate client state event 210 in response to a webpage being loaded, or unloaded. Capture library 124 also may generate client state event 210 in response to screen gesture 130, such as whenever a user touches, scrolls, pinches, and/or lifts fingers off of screen 126.

Replay system 112 may use display information 212 within client state event 210 to reproduce images previously displayed on screen 126 during application session 106. For example, a pageWidth field and a pageHeight field may identify the width and height, respectively, of the electronic document displayed as webpage 134. ViewPortWidth and viewPortHeight fields may identify the width and height of the webpage viewport. ViewPortX and viewPortY fields may identify x and y positions, respectively, of the scrollbar on the viewport. For example, a position of a horizontal scroll bar on the web browser may identified by the viewPortX field and a position of a vertical scroll bar may be identified by the viewport Y field.

A deviceOrientation field may identify a portrait or landscape orientation of the screen of client device 120. An event field may identify the event that triggered the capture library to generate client state event 210. For example, the event field may identify screen events such as a page load, a page unload, a page resize, a page scroll, a page touch, or a page touch end event.

A deviceScale field may identify a scale factor for recreating a size of screen 126. For example, replay system 112 may scale the size of a webpage based on the deviceScale field. A viewTime field may identify an amount of time in milliseconds the webpage was displayed on screen 126.

Multiple client state events 210 may be generated in response to the same screen gesture 130. For example, a scroll screen gesture 130 may comprise multiple gesture states, such as a user pressing a finger against screen 126, scrolling the finger over screen 126, and then lifting the finger off of screen 126. Capture library 124 may generate client state events 210 for each gesture state. Capture library 124 may queue up the client state events 210 in the order captured and then send client state events 136 to PCA 108 or a dummy webpage in website server 102 that are then captured by PCA 108.

FIG. 3C depicts an example of a second type of gesture event 136 referred to as a control event 220. Control event 220 may identify changes to control elements within webpage 134. For example, control event 220 may identify a user selecting an electronic webpage icon or entering data into a webpage text field. Control event 220 also may identify certain types of gestures, such as touch start, touch end, touch cancel or touch move event. Capture library 124 also may send control event 220 to web server 103 or to PCA 108 for combining with other client events 135.

A focusInOffset field may identify an offset when a focusIn event is detected in a text field. For example, a user may select a field displayed in webpage 134. The focusInOffset field may identify the amount of time from when the field is selected to when text is entered into the field.

A target field may identify the control element being logged, such as a field or icon selected by the user. A position field may identify the position of the control element being logged. For example, the position field may identify an x and y position of the selected field or icon in webpage 134. Height and width fields may identify the height and width of the control element.

A relXY field identify a relative x and y ratio that indicates where the user clicked on the control element. An id field may identify a name or tag assigned to the control element. An idType field may identify a type of identifier, such as an identifier, name, or xPath.

A dwell field may identify a dwell time a user spent on the control element. A visitedCount field may identify a number of times the user visited the control element. For example, a user may type their name into a name field. The user then may click on a different field on the webpage and then reselect the name field and edit the previously entered name. The visitedCount field may contain the value of two to represent the two times the user selected the name field.

A isParentLink field may identify a type of link associated with the control field, such as a hyperlink. A name field may identify the name of the selected control element and a type field may identify a type of the selected control element, such as a button. A subType field may identify a subtype of control element underneath a parent control element. A tlType field may identify a generic name for the control element. For example, different web applications may use different names for a similar type of button control element. The tlType field may provide a generic name for the button control element.

A prevState field may identify a previous state of the control element and a currState field may identify a current state of the control element. For example, the previous state of a text field may be blank and the current state of the text field may contain text. An event field may identify the gesture event that triggered capture library 124 to capture control event 220. For example, capture library 124 may generate control event 220 in response to a mouse click selecting a button icon or may generate a control event in response selection and entry of text into a text field. An event field may identify control events and child control events within the control events.

Other generic information may be identified in gesture events 136. For example, a type field may identify the type of message containing the gesture event. An offset field may identify in milliseconds an offset from a start of a media stream. A screenviewOffset field may identify an offset from a start of an application context or state. A fromWeb field may identify application 122 as a web application or a native application.

A count field may identify the number of messages generated for a particular screen gesture 130. For example, multiple gesture events 136 may be generated for a series of scroll screen gestures. Capture library 124 may assign sequential count numbers to the gesture events 136 associated with the same screen gesture 130.

Figure 4:
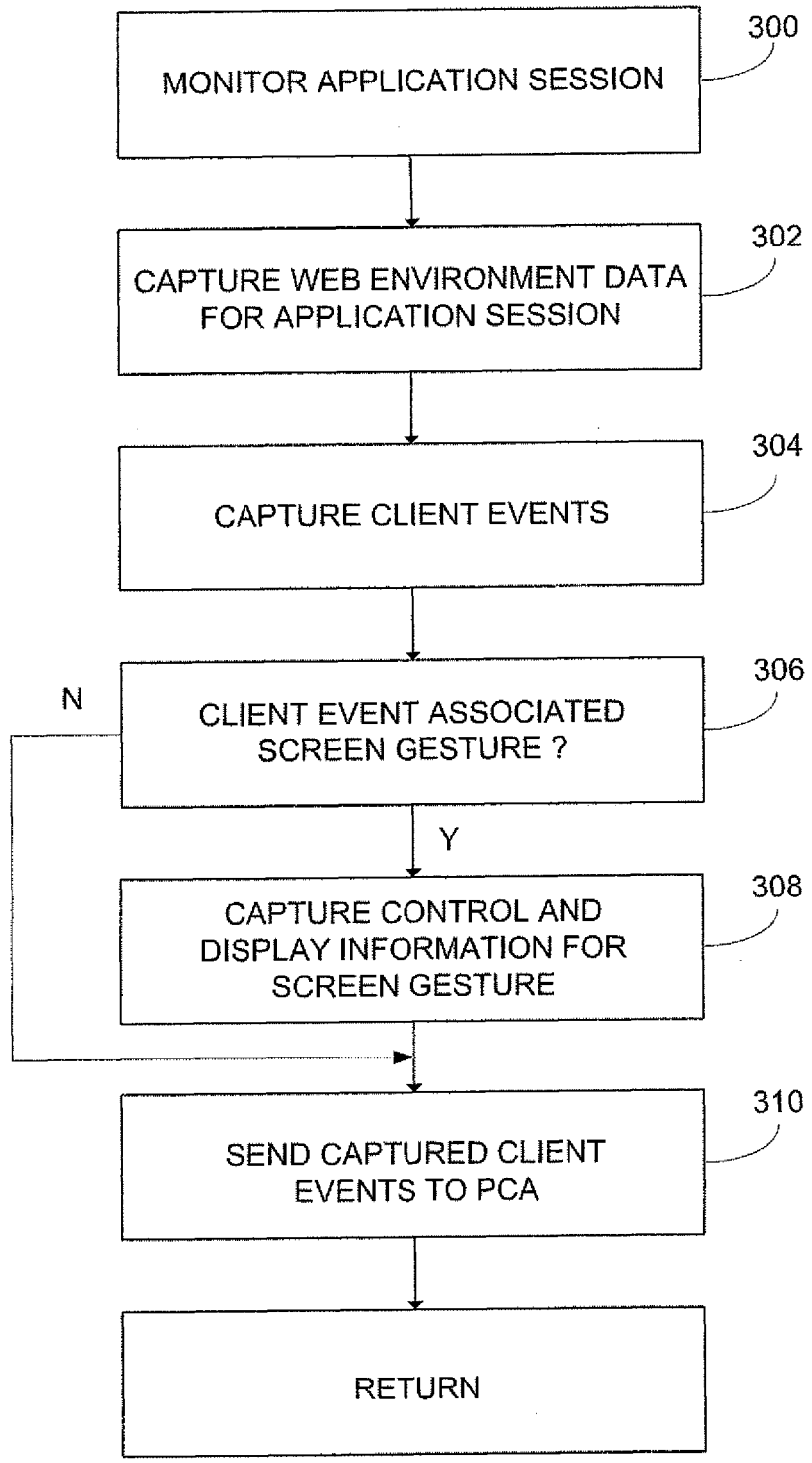
FIG. 4 depicts an example process for capturing gesture events.

FIG. 4 depicts an example process for generating gesture events. The capture library and the PCA may monitor an application session in operation 300. Operation 302 may capture the web environment data for the application session. As explained above, the web environment data may identify the physical dimensions of the client device and the display screen used during the application session. Operation 304 may capture client events during the monitored application session. Operation 306 may identify client events associated with screen gestures. For example, a group of client events may be associated with a user pressing and sliding a finger across a screen.

Operation 308 may capture any control or display information associated with the screen gesture. For example, operation 308 may generate a first gesture event in response to a webpage being loaded. The first gesture event may contain display information showing how the webpage originally appeared on the screen of the client device. Operation 308 may generate a second gesture event identifying a user scrolling a finger over the screen. A third gesture event may identify a touch end event when the hand of the user is lifted off of the screen. Operation 308 then may generate a fourth gesture event containing display information showing how the webpage appeared on the screen after the third gesture event.

Operation 310 may send the captured client events to the PCA. In one example, the client events may be generated in a JavaScript Object Notation (BON) format. However, any format may be used.

Figure 5:
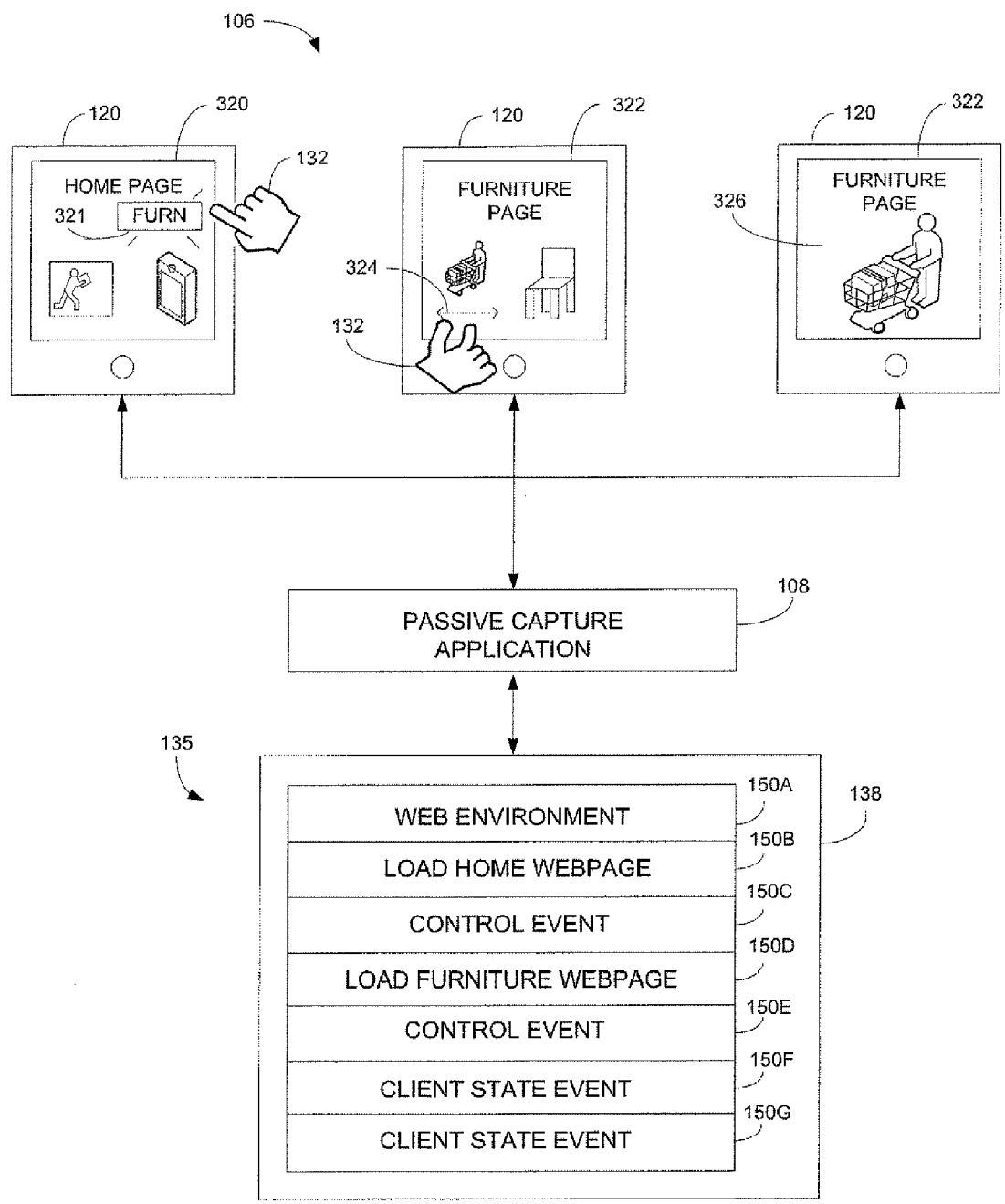
FIG. 5 depicts an example of gesture events captured for an application session.

FIG. 5 depicts an example of client events 135 containing gesture related events and information 150 for application session 106. In this example, one of more of client events 135 may contain web environment data 150A identifying the physical parameters of client device 120 during application session 106. Web environment data 150A may be used during replay to set up on initial display base for replaying webpages.

A load home webpage event 150B may contain image data identifying how a home webpage 320 was loaded and displayed on client device 120. Control event 150C may identify control information associated with home webpage 320. For example, control event 150C may identify a link 321 selected on home webpage 320. Selecting link 321 may initiate another load furniture webpage event 150D that loads a furniture webpage 322 into client device 120.

A screen gesture 324 associated with webpage 322 may generate several gesture events. For example, screen gesture 324 may comprise a pinch operation that resizes and scrolls webpage 322. The capture library may generate a series of gesture events 150E-150F containing control and display information associated with screen gesture 324, For example, control event 150E may identify screen gesture 324, client state event 150F may contain display information identifying how webpage 322 was displayed on client device 120 during an intermediate state of screen gesture 324, and client state event 150G may contain display information identifying how webpage 322 was displayed on client device 120 after completion of screen gesture 324.

Time stamps may be added to client events 135 so the replay system can reproduce a same sequence of display states generated during application session 106. Finger placement may be added as animation during replay to show where the user started and ended a gesture. For example, the replay system may display an image of a hand representing movement of hand 132 on the screen of client device 120.

For illustration purposes, different states of application session 106 may be represented as separate client events 135. However, it should be understood that any combination of control states and display states may be combined into a same client event 135 and any combination of client events 135 may be combined into a same message and captured by PCA 108.

Figure 6:
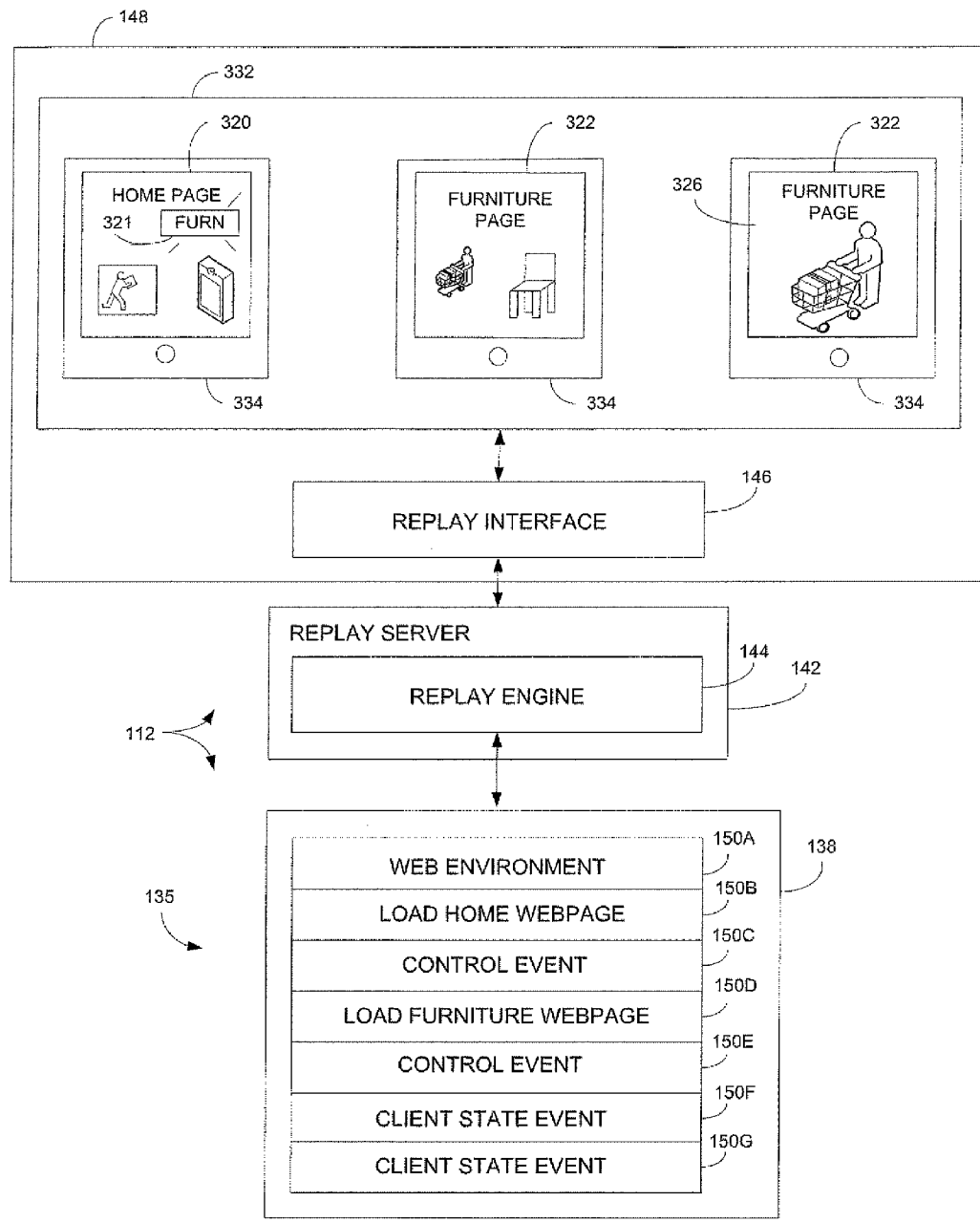
FIG. 6 depicts an example of gesture events replayed for an application session.

FIG. 6 depicts one example showing how replay system 112 replays a captured application session. Replay system 112 may comprise a server based architecture where replay engine 144 on replay server 142 renders webpages 320 and 322. However, static webpages may not be able to recreate some touch screen gestures such as zoom, scroll, and/or slide gestures.

Replay system 112 may use a client side replay interface to generate screen gesture related events. In one example, replay interface 146 may operate a browser 332 on computer 148 and may provide a cleaner implementation for high fidelity replay. Replay engine 144 may render electronic pages on replay server 142 and return the rendered webpages to replay interface 146. Once loaded, replay interface 146 may modify how the webpages are displayed based on captured gesture events.

A navigation list may identify the webpages captured during the application session. Each webpage may have one or more associated client events 135. A user may select one of the webpages from the navigation list. Replay interface 146 may draw a skin 334 representing the physical dimensions of the screen for the client device operated during the original application session. Replay interface 146 then may display webpages within the skin.

Once a webpage is loaded into skin 334, replay system 112 may use browser 332 to simulate images resulting from screen gestures and apply other webpage transformations based on associated client events. For example, replay interface 146 may use Cascading Style Sheets 3 (CSS3) to vary a scale, size, or position of webpages within skin 334 and may provide additional animation effects. CSS3 may be used to provide browser renderings without using other plug-ins for the browser.

Replay system 112 is not limited to CSS3 and is not platform specific. For example, other implementations may use other technologies such as Adobe flash, Silverlight, or other browser plug-ins. Replay system also may use multiple different technologies to the replay application session 106. For example, a pinch-in animation may be produced through CSS3 and a scroll/slide animation may be produced through a JavaScript function.

In this example, an operator may access the captured application session file in database 138 via computing device 148. The operator may select home webpage 320. Replay system 112 may display a skin 334 based on web environment data 150A and render webpage 320 within skin 334. Replay system 112 may scale, size, and/or position rendered webpage 320 within skin 334 based associated client events. For example, replay system 112 may display home webpage 320 based on image information in load home webpage event 150B. Replay system 112 then may apply user inputs to webpage 320 based on other control events. For example, replay system 112 may highlight link 321 based on control information in control event 150C.

Replay system 112 may identify and display furniture webpage 322 within skin 334 based on display information in load furniture webpage event 150D. Replay system 112 may modify how furniture webpage 322 is displayed within skin 334 based on associated client events. For example, control event 150E may identify screen gesture 324 in FIG. 5, User interface 146 then may apply a CSS3 transformation and animation to webpage 322 based on display information in client state events 150F and 150G associated with screen gesture 324 in FIG. 5.

Replay system 112 may automatically replay client state events 150F and 150G in response to the user selecting associated control event 150E. For example, a user may click on control event 150E from the navigation list. Replay system 112 may determine control event 150E is related to screen gesture 324 in FIG. 5. Replay system 330 may determine that client state events 150F and 150G are also associated with the same screen gesture 324. For example, events 150E-150G may have a same gesture identifier and have sequential time stamp values. Replay interface 146 then may modify a location 326 and zoom level of webpage 322 based within skin 322 based in display information in client state events 150F and/or 150G.

Figure 7:
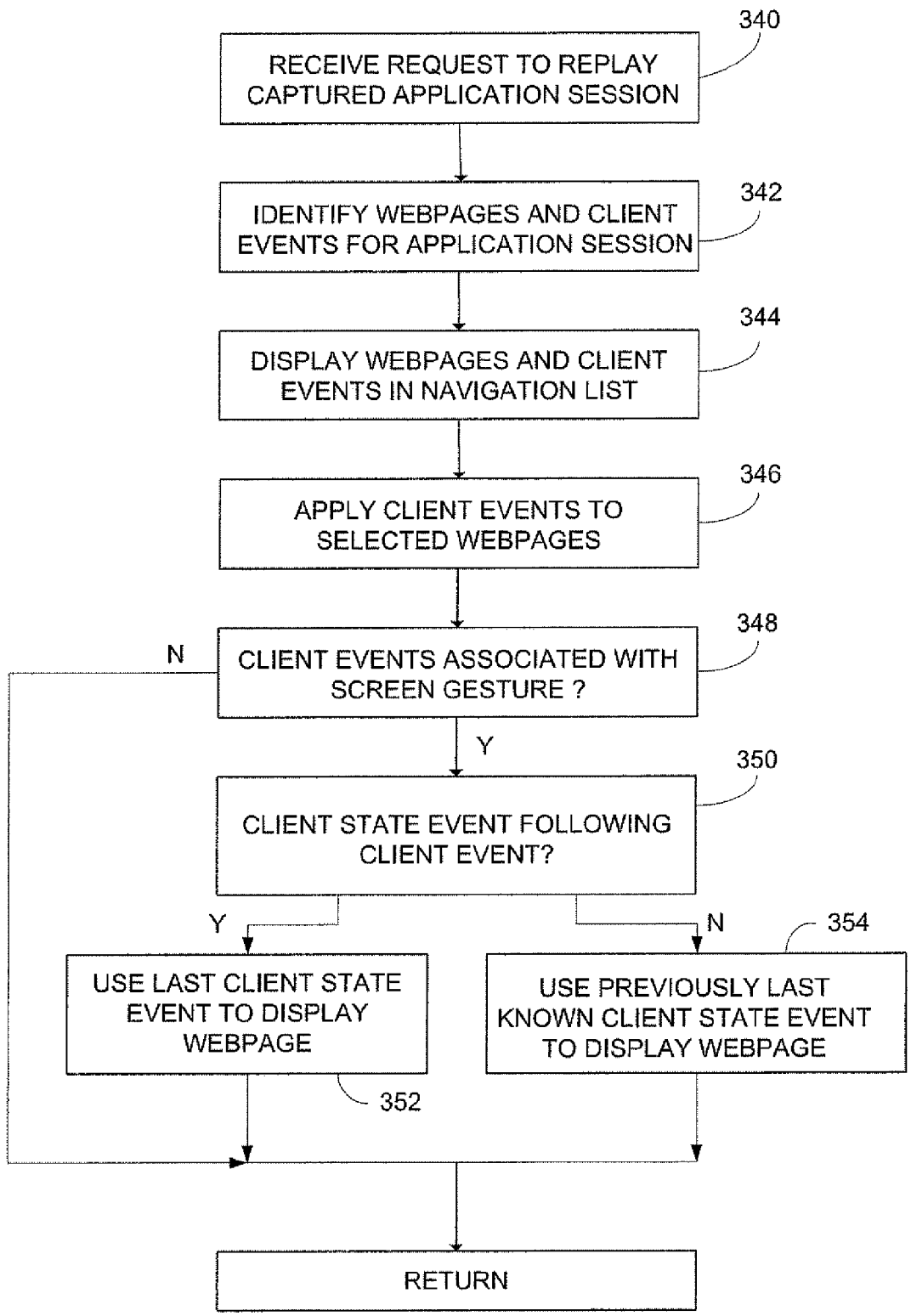
FIG. 7 depicts an example process for replaying gesture events.

FIG. 7 depicts one example process for replaying captured application sessions. In operation 340 the replay system may receive a request to replay a captured application session. For example, a user may access a website operated by the replay server and identify a particular application session associated with the replay request. A unique identifier may be assigned to the captured client events associated with the same application session. In operation 342 the replay system may identify the webpages and client events associated with the application session.

In operation 344, the replay system may display a navigation list showing the webpages that were loaded on the client device during the application session and may show client events associated with the webpages. In operation 346, the replay system may detect selection of one of the webpages and/or selection of an associated client event from the navigation list. The replay system may apply the selected client events to the associated webpage. For example, during the application session a user may have entered text into a webpage field. The capture library may generate a client event containing the text entered into the webpage field. The replay system may replay the client event by showing the text entered into the webpage field.

In operation 348, the replay system may identify client events associated with screen gestures. If no screen gestures events are identified, the replay system may return to operation 344 and process a next client event.

If client events are associated with a screen gesture in operation 348, operation 350 may determine if any client state events are associated with the screen gesture. For example, a user may have selected a field within a webpage and entered text into the field. However, the user may not have applied any other screen gestures to the webpage. The capture library may have generated a control event in response to the user touching the field but may not generate any other client state events 210 (FIG. 3B).

If no client state events follow the control event in operation 350, operation 354 may search for a previously captured client state event. For example, the replay system may use display information in the first client state data preceding the control event. This may reproduce the display state of the client device just prior to the screen gesture.

Operation 350 may detect one or more client state events 210 following the control. For example, multiple client state events may be generated in response to a pinch screen gesture. Operation 352 may display the rendered webpage based on the display information in the client state events following the control event. In one example, the replay system may display the webpage based on a last associated client state event. The last client state event may represent the display state of the client device after completion of the screen gesture. In another example, the replay system may recreate other intermediate display states of the webpage based on the other client state events.

FIGS. 8A-8D depict examples of images displayed during an application session. FIGS. 9A-9D depict examples of images recreated by a replay system based on client events captured during the application session.

Figure 8A:
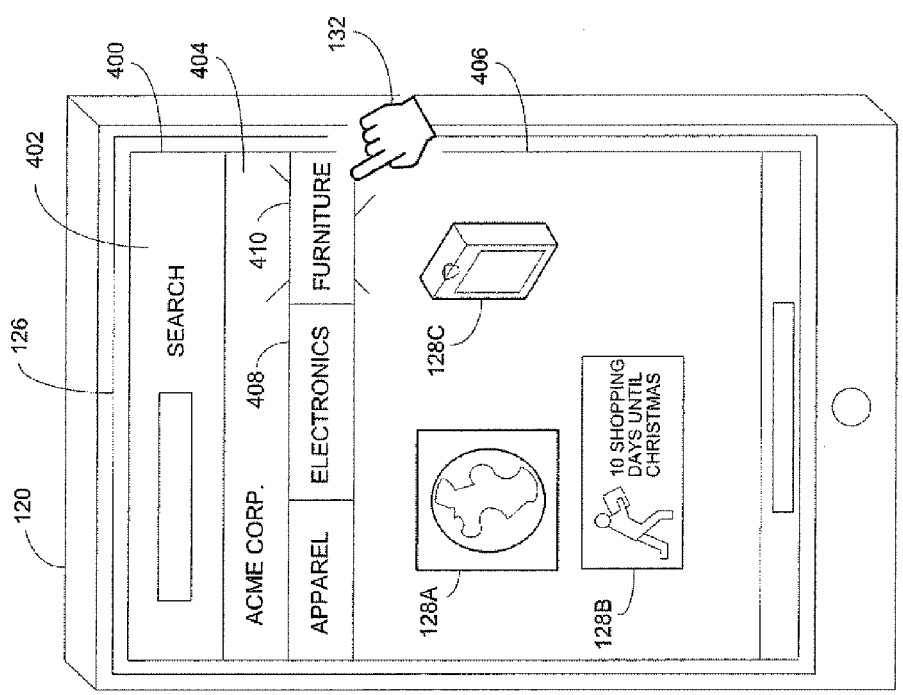
FIGS. 8A-8D depict examples of images displayed during an application session.

FIG. 8A depicts an example of client device 120 having display screen 126. In one example, client device 120 operates a web browser 400 having a tool bar 402 and a viewport 406. Web browser 400 may download a home webpage 404 in viewport 406 during the application session. Home webpage 404 may contain images 128A-128C and icons 408 for selecting other webpages. The capture library may generate a client event that identifies the loading of a home webpage 402.

After browser 400 displays home webpage 404, a user may use hand 132 to select one of icons 408 that activates a link 410 to a furniture webpage. The capture library may generate another client event that identifies control information for home webpage 404 that highlights the selected icon 408 in response to selection by hand 132. The same or another client event may contain web environment data that identifies the physical dimensions and pixel ratios of screen 126, tool bar 402, view port 406, and webpage 400.

Figure 9A:
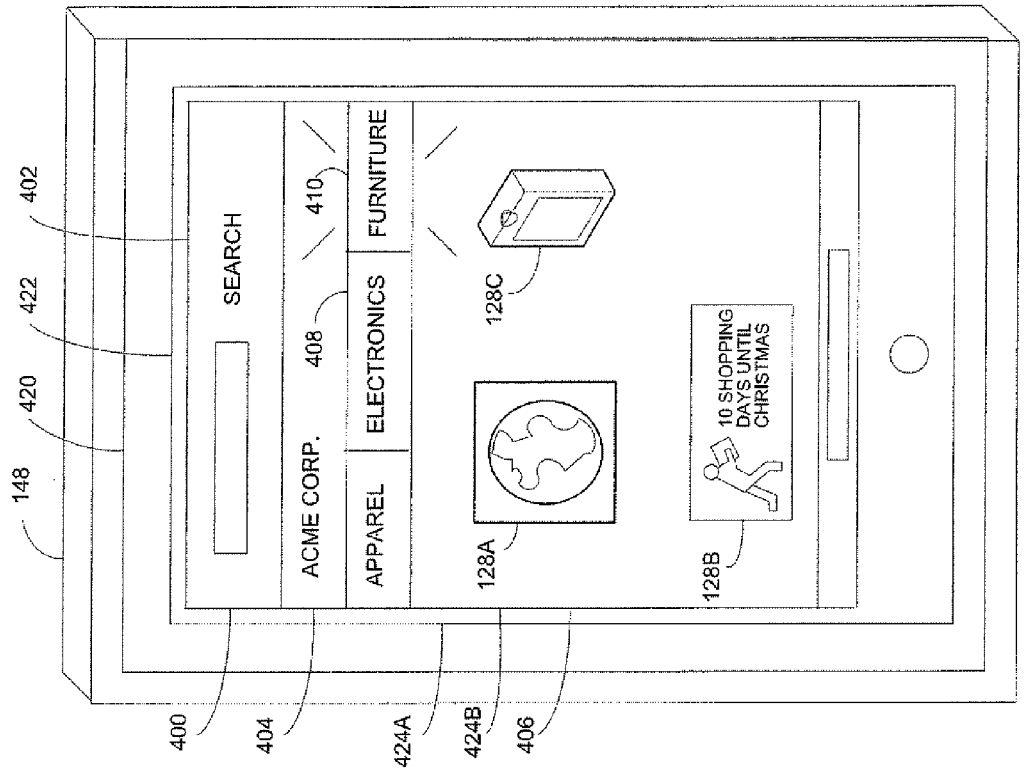
FIGS. 9A-9D depict examples of how images for an application session are recreated during a replay session.

FIG. 9A depicts an example of how the replay system may reproduce home webpage 404. Computer 148 includes a screen 420 and may access the replay server. In one example, the replay system may use the web environment data in the captured client events to generate a skin 422. Skin 422 may include an outline 424A corresponding to an outer dimension of client device 120 in FIG. 8A and an outline 424B corresponding to an outer dimension of screen 126 in FIG. 8A.

The replay system may use the web environment data to display home webpage 404 within skin 422. For example, the client events may identify the dimensions of tool bar 402 and viewport 406. Other client events also may identify the portion of home webpage 404 displayed within viewport 406. The replay system then may identify control information in one of the captured client events that highlights one of icons 408 associated with link 410. The replay system may use the control information to highlight icon 408.

Figure 8B:
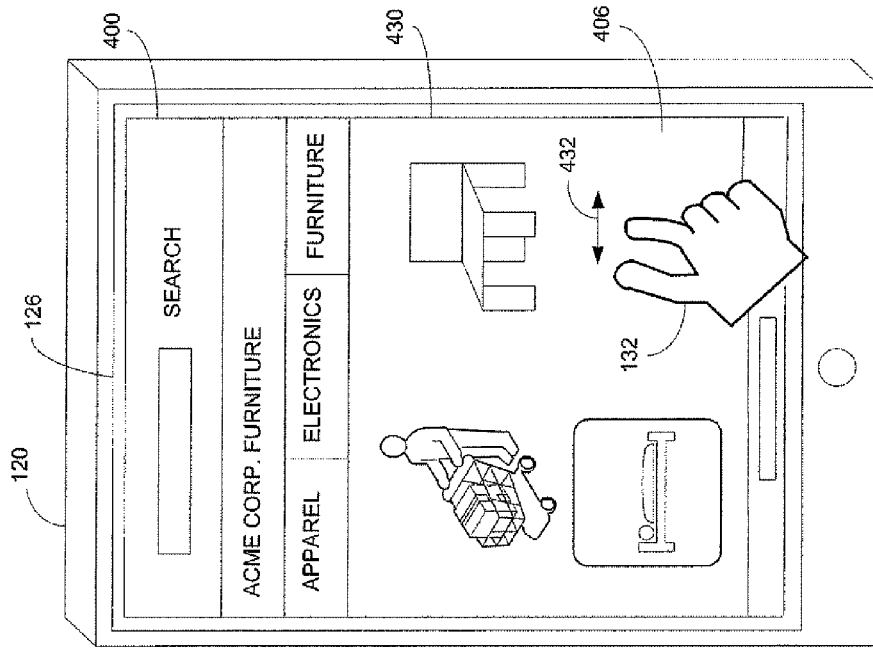
Figure 8C:
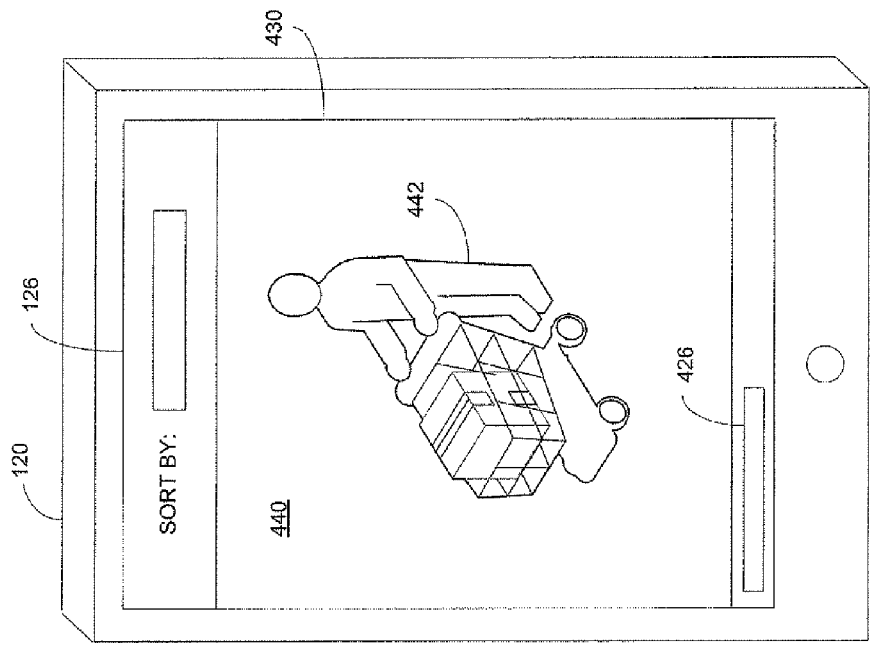

FIG. 8B depicts a second state of the application session where browser 400 displays furniture webpage 430. In this example, hand 132 may perform a pinch-out or pinch-open screen gesture 432 on screen 126 to zoom-in on furniture webpage 430. FIG. 8C depicts a third state of the application session showing how client device 120 may display furniture webpage 430 in response to screen gesture 432. Client device 120 may display a zoomed in portion 440 of furniture webpage 430 in response to screen gesture 432 in FIG. 8B.

The capture library may generate a client event that identifies the loading of furniture webpage 430. The same or another client event also may contain display information identifying how furniture webpage 430 is initially displayed on screen 126 in FIG. 8B. The capture library then may generate multiple client events associated with screen gesture 432. For example, the capture library may generate a first control event that identifies pinch gesture 432. The capture library then may generate one or more client state events that contain display information identifying how client device 120 displayed furniture webpage 430 in response to screen gesture 432. For example, the capture library may capture display information identifying how webpage 430 was displayed within screen 126 in response to screen gesture 432 in FIG. 8B. In this example, screen gesture is a zoom-in gesture that causes client device 120 to display a portion 440 of webpage 430 and enlarge image 442.

Figure 9B:
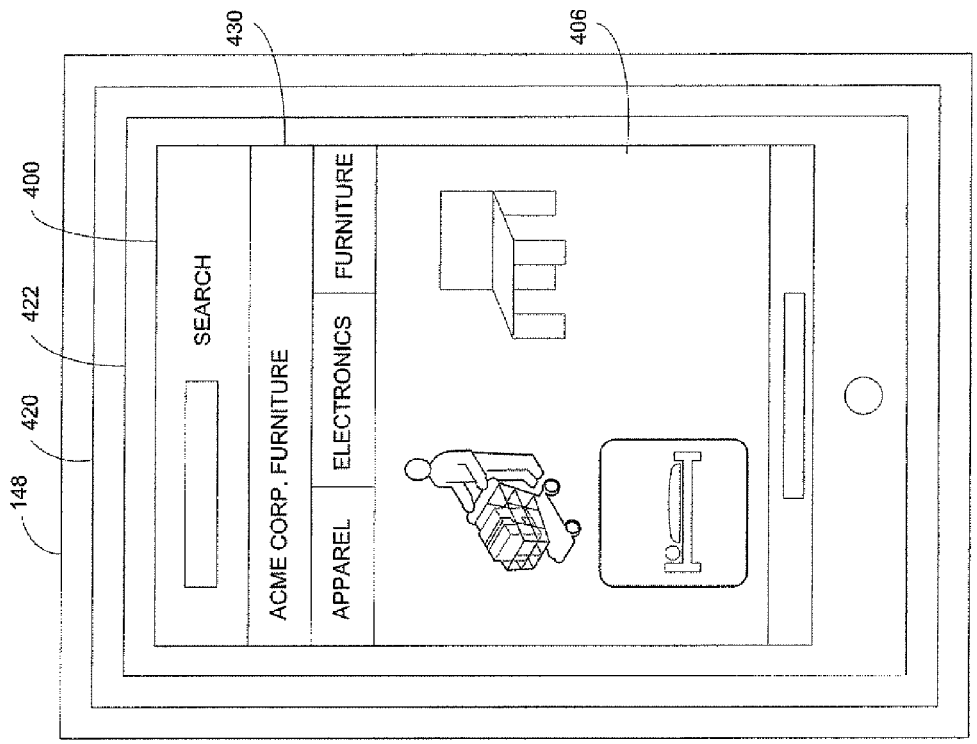

FIG. 9B depicts an example how the replay system may initially display furniture webpage 430 prior to screen gesture 432 in FIG. 8B. The replay system may render webpage 430 from HTML previously captured for the application session. The replay system then may adjust the size, pixel ratio, scale, portion and/or location of webpage 430 displayed in skin 422 based on display information in associated client events.

Figure 9C:
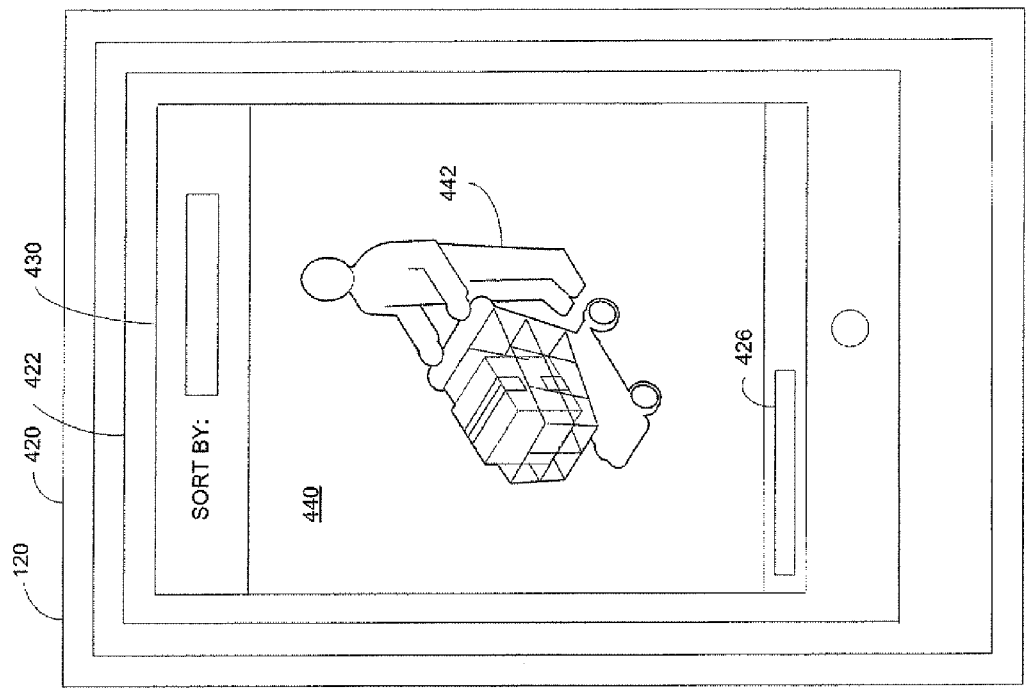

FIG. 9C depicts an example of how the replay system may replay the application session based on screen gesture 432 in FIG. 8B. As mentioned above, the capture library may have captured multiple client state events associated with screen gesture 432. In one example, display information in the last client state event may be used for recreating a final display state of furniture webpage 430 after completion of screen gesture 432. In another example, the replay system may use display information in multiple client events to display multiple different images of furniture webpage 430 during and/or after screen gesture 432.

The replay system may apply various transformations to furniture webpage 430 based on associated client events. For example, the replay system may zoom furniture webpage 430 based on device scale information in associated client events. Images, such as image 442 may be displayed enlarged based on the zoom gesture. The replay system also may display a portion 440 of webpage 430 and display a position of a scroll bar 426 based on x viewport and y viewport values identified in the client events.

Figure 8D:
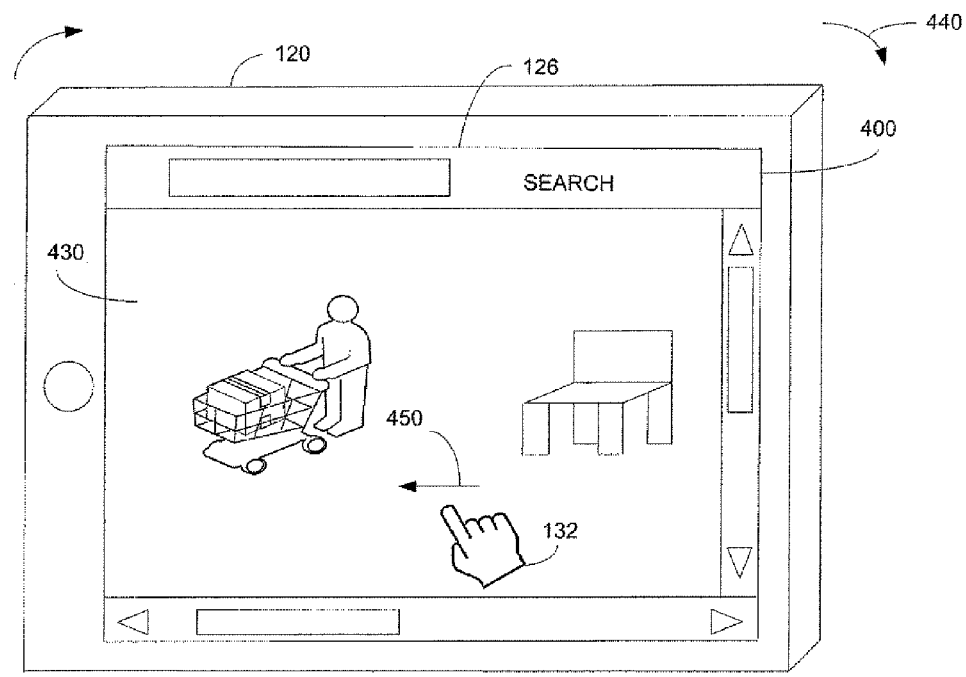

FIG. 8D depicts an example of how an orientation of client device 120 may change during the application session. In this example, the user may rotate client device 120 in a clockwise direction 440 so that a longer x-axis of client device 120 is aligned horizontally and a shorter y-axis of client device 120 is aligned vertically. In response to the rotation, client device 120 may switch from displaying furniture webpage 430 on screen 126 in a portrait mode to displaying webpage 430 in a landscape mode.

After rotating client device 120, the user then may perform a scroll screen gesture 450 by sliding a finder of hand 132 across screen 126.

The capture library may generate client events containing image information associated with the rotation of client device 120 and image information associated with screen gesture 450.

Figure 9D:
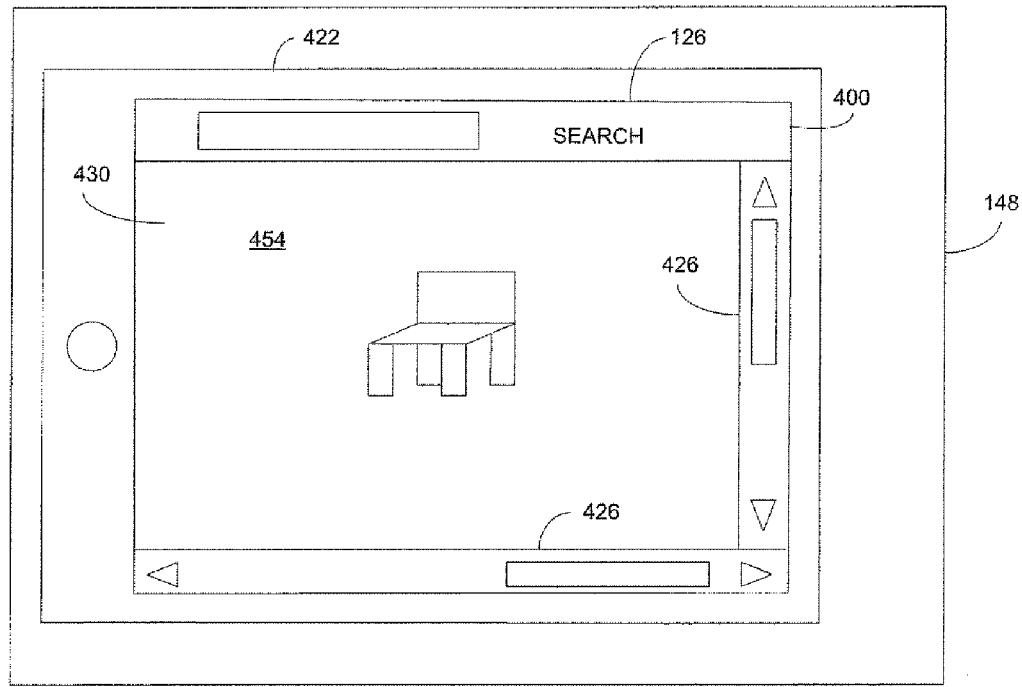

FIG. 9D depicts one example of how the replay system may use the image information in the client events to recreate the display states shown in FIG. 8D. The replay system may rotate skin 422 within the screen of computing device 148 to simulate the rotation of client device 120 into the landscape display mode. The replay system may display scroll bars 426 and a portion 454 of furniture webpage 430 based on the x viewport and y viewport display information associated with screen gesture 450.

Hardware and Software

Figure 10:
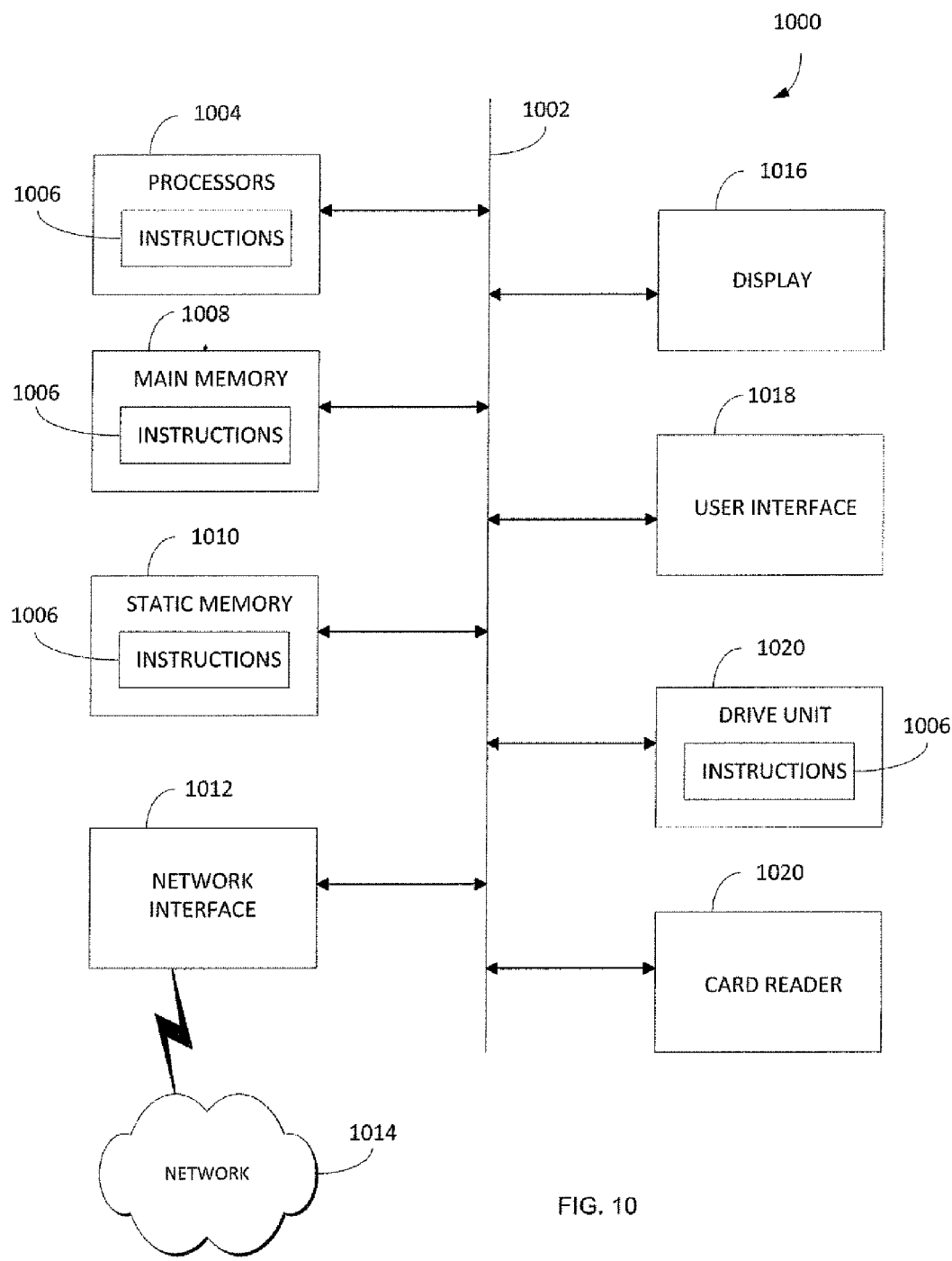
FIG. 10 depicts an example computing system for capturing and replaying screen gestures.

FIG. 10 shows a computing device 1000 that may be used for operating the system used for capturing and replaying screen gestures as discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A computer program product for replaying a stored application session, the computer program product comprising a computer readable storage medium having program code embodied therewith, the program code readable/executable by a computer to perform a method comprising:
   receiving, by the computer, client events associated with the stored application session of a client device, wherein the client events include a plurality of gesture events associated with screen gestures applied to the client device during the stored application session, and wherein each client event includes a time stamp that indicates a time that the client event occurred within the stored application session;
   identifying, by the computer, a screen gesture applied to the client device during the stored application session, including:
      identifying, by the computer, a first gesture event associated with an initiation of the screen gesture based on a gesture identifier and a time stamp associated with the first gesture event, wherein the screen gesture prompted manipulation of an image displayed on a display screen of the client device during the stored application session, and wherein the gesture identifier associated with the first gesture event indicates a type of the screen gesture;
      identifying, by the computer, a second gesture event associated with the screen gesture based on a gesture identifier and time stamp associated with the second gesture event, wherein the gesture identifier associated with the second gesture event is the same as the gesture identifier associated with the first gesture event, and wherein the time stamp associated with the second gesture event is sequential in time to the time stamp associated with the first gesture event;
   extracting, by the computer, first display information from the first gesture event in response to identifying the first gesture event, wherein the first display information includes a location, size, and orientation of the image as displayed on the display screen when the first gesture event was captured;
   extracting, by the computer, second display information from the second gesture event in response to identifying the second gesture event, wherein the second display information includes a location, size, and orientation of the image after the manipulation of the image as displayed on the display screen when the second gesture event was captured;
   displaying, on an output interface of the computer, a skin, wherein the skin is a size of the display screen of the client device;
   displaying, on the output interface of the computer within the skin, the image as displayed on the display screen of the client device when the first gesture event was captured; and
   displaying, on the output interface of the computer within the skin, the image as displayed on the display screen when the second gesture event was captured;
   wherein, if the screen gesture comprises a reorientation of the client device, rotating the skin and the image to simulate the reorientation of the client device.

2. The computer program product of claim 1, wherein:
   the first display information comprises:
      a size of the display screen of the client device; and
      a size of a viewport for a web browser displayed on the display screen when the first gesture event was captured; and
   the second display information comprises:
      the size of the display screen of the client device; and
      a size of the viewport for the web browser displayed on the display screen when the second gesture event was captured.

3. The computer program product of claim 1, wherein the first display information comprises a pixel ratio between a number of pixels of the display screen of the client device and a number of pixels used for the image displayed on the client device when the first gesture event was captured, and wherein the second display information comprises a pixel ratio between the number of pixels of the display screen of the client device and a number of pixels for the image displayed on the client device when the second gesture event was captured.

4. The computer program product of claim 1, wherein the first display information comprises a first scroll bar location for a web browser used in the stored application session when the first gesture event was captured, and wherein the second display information comprises a second scroll bar location for the web browser when the second gesture event was captured.

5. The computer program product of claim 1, wherein the method further comprises:
   identifying, by the computer, the size of the display screen of the client device used in the stored application session based on either the first display information extracted from the first gesture event or the second display information extracted from the second gesture event;
   displaying, on the output interface, the image, prior to the manipulation of the image, within the skin based on the location, size, and orientation of the image when the first gesture event was captured; and
   displaying, on the output interface, the image, after the manipulation of the image, within the skin based on the location, size, and orientation of the image when the second gesture event was captured.

6. The computer program product of claim 1, wherein the method further comprises displaying, on the output interface of the computer, an animation indicating a finger placement associated with the screen gesture.

7. The computer program product of claim 6, wherein the animation includes an image of a hand that represents performance of the screen gesture.

8. The computer program product of claim 6, wherein the method further comprises identifying, by the computer, the type of the screen gesture based on a gesture identifier selected from the group consisting of the gesture identifier associated with the first gesture event and the gesture identifier associated with the second gesture event, wherein the animation is based, at least in part, on the type of the screen gesture.

9. The computer program product of claim 1, wherein the method further comprises:

identifying, by the computer, a height of a toolbar, from the first display information, associated with the first gesture event, wherein displaying the image prior to the manipulation of the image includes adjusting a scale factor of the image based on the height of the toolbar associated with the first gesture event; and identifying, by the computer, a height of a toolbar, from the second display information, associated with the second gesture event, wherein displaying the image after the manipulation of the image includes adjusting a scale factor of the image based on the height of the toolbar associated with the second gesture event.

10. An apparatus, comprising:
a memory configured to store gesture events associated with screen gestures applied to a remote device during an application session; and
a computer operatively coupled to the memory and configured to:
identify, from the gesture events, a screen gesture applied to the remote device during the application session based on a series of gesture events associated with a gesture identifier and sequential time stamp values, wherein the gesture identifier indicates a type of the screen gesture and the time stamp values indicate times that the series of gesture events occurred during the application session;
extract, from the series of gesture events, a size of a screen of the remote device;
extract, from the series of gesture events, display information associated with a first gesture event that indicates a start of the screen gesture, wherein the display information associated with the first gesture event includes a location, size, and orientation;
extract, from the series of gesture events, display information associated with a second gesture event that indicates a termination of the screen gesture, wherein the display information associated with the second gesture event includes a location, size, and orientation;
display, on an output interface of the computer, a first image representing the screen of the remote device, wherein the first image includes a skin and replicates the size of the screen extracted from the series of gesture events;
display, on the output interface, a second image within the first image, wherein the second image includes elements displayed on the screen of the remote device during the first gesture event based on the display information associated with the first gesture event extracted from the series of gesture events; and
display, on the output interface, a third image within the first image, wherein the third image includes elements displayed on the screen of the remote device during the second gesture event based on the display information associated with the second gesture event extracted from the series of gesture events;
wherein, if the first and second gesture events comprise a reorientation of the remote device, rotate the skin and the second and third images to simulate the reorientation of the remote device.

11. The apparatus of claim 10, wherein the screen comprises a touch screen and the screen gesture comprises scrolling over the touch screen.

12. The apparatus of claim 10, wherein the screen gestures comprise one or more of a scroll gesture, a touch start gesture, a touch move gesture, a touch end gesture, a pinch gesture, and a reorientation of the remote device.

13. The apparatus of claim 10, wherein:
the screen gesture was applied to a webpage displayed on the remote device during the application session, wherein the second image includes a first image of the webpage as displayed during the first gesture event, and wherein the third image includes a second image of the webpage as displayed during the second gesture event.

14. The apparatus of claim 10, wherein the computer is further configured to display an animation within the first image indicating a finger placement associated with the screen gesture.

15. A method, comprising:
monitoring, by a processing circuit, for events associated with an application session;
identifying, by the processing circuit, an initiation event associated with a screen gesture from the events based on a gesture identifier associated with the initiation event being different than a gesture identifier associated with a prior, sequential event, wherein the screen gesture prompted manipulation of an image displayed during the application session, wherein the gesture identifier associated with the initiation event indicates a type of the screen gesture, and wherein the initiation event indicates an initiation of a contact with a computer touch screen during the application session;
identifying, by the processing circuit, a terminating event associated with the screen gesture from the events based on a gesture identifier associated with the terminating event being different than a gesture identifier associated with a subsequent, sequential event, wherein the gesture identifier associated with the terminating event indicates the type of the screen gesture, and wherein the terminating event indicates a release of the contact with the computer touch screen during the application session;
capturing, by the processing circuit, display information associated with the initiation event, wherein the display information associated with the initiation event comprises a location, size and orientation of the image prior to the manipulation of the image, and wherein the display information associated with the initiation event is configured to reproduce the image displayed in the application session prior to the manipulation of the image;
capturing, by the processing circuit, display information associated with the terminating event, wherein the display information associated with the terminating event comprises a location, size, and orientation of the manipulated image, and wherein the display information associated with the terminating event is configured to reproduce the manipulated image displayed in the application session in response to the screen gesture;
displaying, by a replay system on an output interface, a skin, wherein the skin is a size of the computer touch screen;
displaying, by the replay system on the output interface within the skin, the image as displayed on the computer touch screen when the initiation event was captured; and
displaying, by the replay system on the output interface within the skin, the image as displayed on the computer touch screen when the terminating event was captured;
wherein, if the initiating and terminating events comprise a reorientation of the computer touch screen, rotating the skin and the image to simulate the reorientation of the computer touch screen.

16. The method of claim 15, wherein the screen gesture comprises a hand applied to the computer touch screen associated with the processing circuit.

17. The method of claim 15, wherein the screen gesture comprises one or more of a scroll gesture, a touch start gesture, a touch move gesture, a touch end gesture, a pinch gesture, and a reorientation of the computer touch screen associated with the processing circuit.

18. The method of claim 15, wherein:
the display information associated with the initiation event comprises:
the size of the computer touch screen associated with the processing circuit used during the application session; and
a size of a viewport for a web browser used during the application session prior to the manipulation of the image; and
the display information associated with the terminating event comprises:
the size of the computer touch screen associated with the processing circuit used during the application session; and
a size of the viewport for the web browser used during the application session after the manipulation of the image.

19. The method of claim 18, wherein the display information associated with the initiation event further comprises a pixel ratio between a number of pixels used in the computer touch screen and a number of pixels used for the viewport prior to the manipulation of the image, and wherein the display information associated with the terminating event further comprises a pixel ratio between the number of pixels used in the computer touch screen and a number of pixels used for the viewport after the manipulation of the image.

20. The method of claim 15, wherein the display information associated with the initiation event comprises a first orientation identifier for the computer touch screen that indicates orientation of the computer touch screen prior to the manipulation of the image, and wherein the display information associated with the terminating event comprises a second orientation identifier for the computer touch screen that indicates orientation of the computer touch screen after the manipulation of the image.

21. The method of claim 15, further comprising:
sending, by the processing circuit, the display information associated with the initiation event to the replay system, wherein the display information associated with the initiation event is configured to enable the replay system to reproduce the image as displayed in the application session prior to the manipulation of the image; and
sending, by the processing circuit, the display information associated with the terminating event to the replay system, wherein the display information associated with the terminating event is configured to enable the replay system to reproduce the image as displayed in the application session after the manipulation of the image.

* * * * *